Nov. 3, 1942.    H. L. McGREGOR    2,300,796
VEHICLE WHEEL TRUCK
Filed Sept. 29, 1941
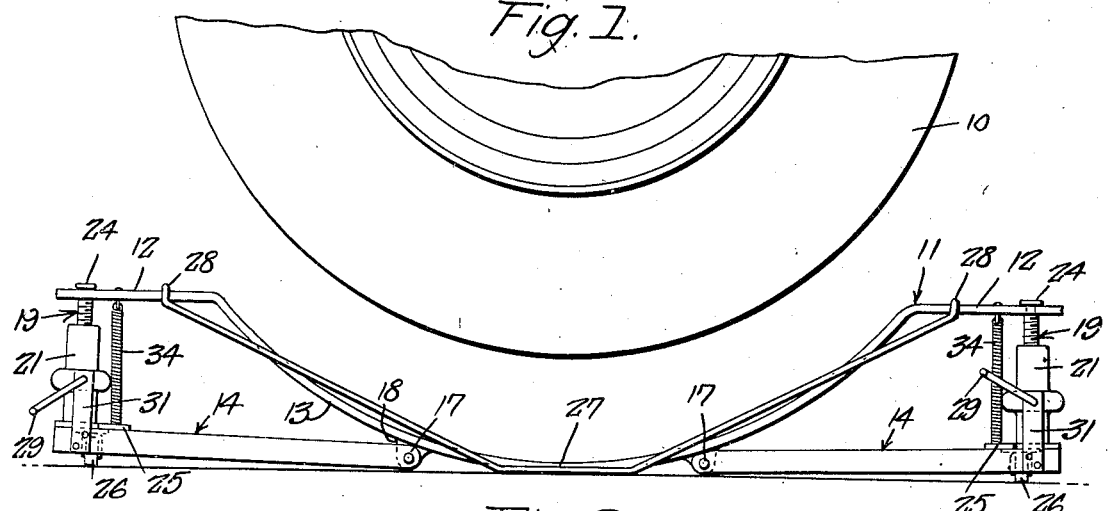
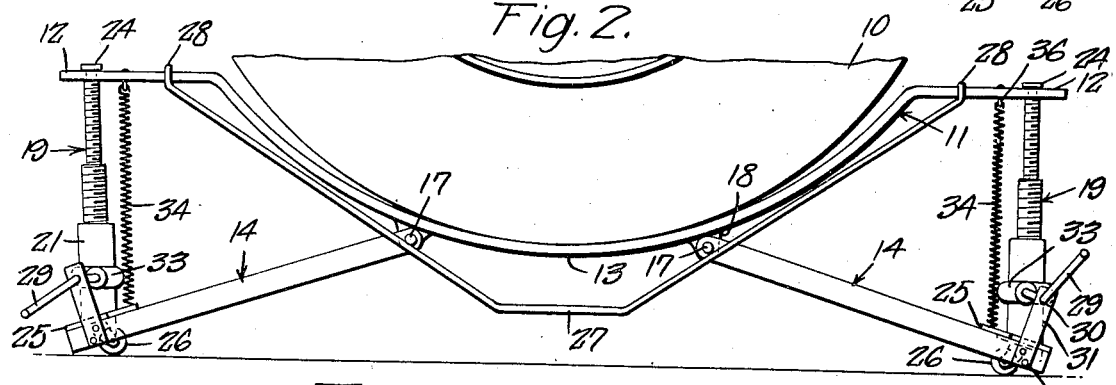
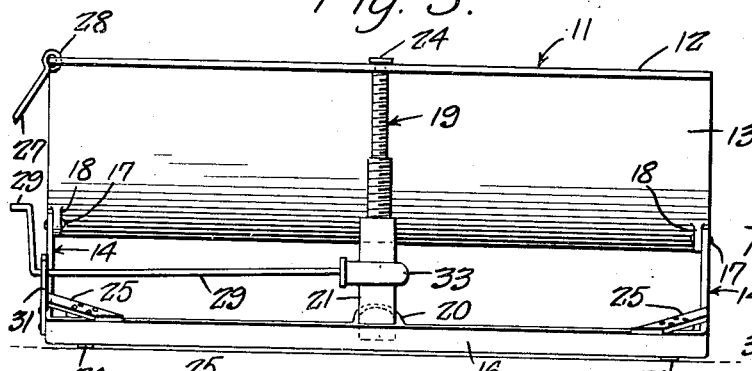
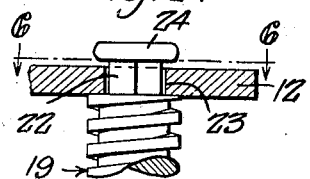
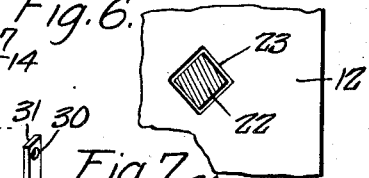
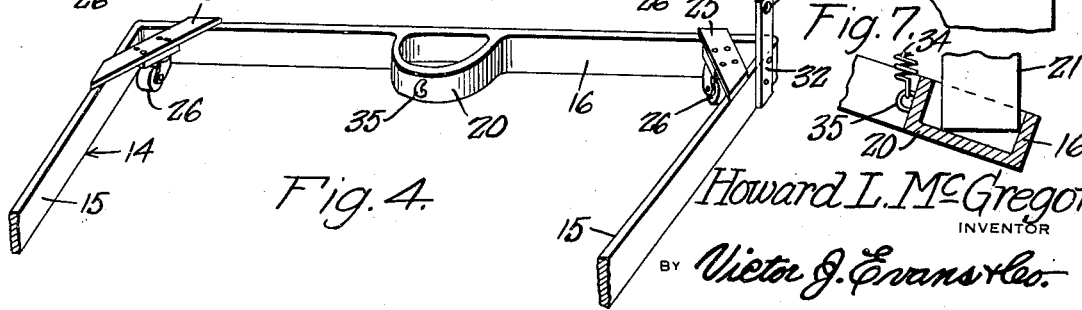
Howard L. McGregor, INVENTOR
BY Victor J. Evans & Co.
ATTORNEYS Patented Nov. 3, 1942

2,300,796

UNITED STATES PATENT OFFICE 2,300,796

VEHICLE WHEEL TRUCK

Howard L. McGregor, Hamilton, N. Y.

Application September 29, 1941, Serial No. 412,907

2 Claims. (Cl. 254—92)

This invention relates to a vehicle wheel truck and has for an object to provide a truck which may be run under a truck wheel when the wheel is jacked up, whereupon the jacks of the truck may be elevated to lift the platform in position to support the wheel to be withdrawn from the axle by pulling the truck away from the vehicle, the center of the wheel being always maintained in alignment with the axle spindle by the platform to effect easy replacement of the wheel after the wheel, or truck, has been repaired.

A further object is to provide apparatus of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a front elevation of a vehicle wheel truck constructed in accordance with the invention, the platform being in lowered position underneath a vehicle wheel.

Figure 2 is a side elevation of the wheel truck shown in Figure 1, with the platform raised to support the vehicle wheel.

Figure 3 is a side elevation of the vehicle wheel truck with the platform raised.

Figure 4 is a fragmentary perspective view of one of the V-shaped frames for pivotally supporting the platform.

Figure 5 is a detail perspective view of the non-rotatable loose connection between the upper end of one of the jacks and the platform.

Figure 6 is a detail cross sectional view taken on the line 6—6 of Figure 5.

Figure 7 is a detail sectional view showing the holder on one of the U-shaped frames for supporting the bottom of the respective jack.

Referring now to the drawing in which like characters of reference designate similar parts in the various views, 10 designates a truck wheel, which may be of the single or dual type weighing from two hundred and fifty to one thousand pounds more or less. For supporting such a wheel during removal and application to the axle spindle, as well as while repairs are being made to the wheel or to the truck, the vehicle wheel truck comprising the subject matter of this invention, includes a platform 11, having flat portions 12 at the sides and having a concave central portion 13 adapted to receive the truck wheel 10 when the heel is jacked up. The supporting frame for the platform comprises two U-shaped frame members 14, a portion of one of the frame members being shown in Figure 4, each frame member comprising side bars 15 and a transversely disposed bar 16. The side bars are connected by pivot pins 17 to hinge ears 18 which extend downwardly from the concave intermediate portion 13 of the platform. One of these frame members is disposed on each side of the central median line of the platform and has its transversely disposed bar 16 extending underneath the flat portion 12 of the platform for supporting a respective jack through the medium of which the platform is raised and lowered.

There are two jacks 19 connected to respective flat portions 12 of the platform and supported in respective jack pockets 20, see Figure 4, secured to the transversely disposed bars 16 of the frame members. The jacks are each of the conventional double screw type, the barrel 21 thereof being loosely supported in the respective pocket 20, see Figure 7. The upper end of the jack is loosely connected to the platform through the medium of a stud 22 of substantially square cross section, see Figure 6, loosely received in a similarly shaped opening 23 formed in the flat portion 12 of the platform. A head 24 is formed integrally with the top of the stud, see Figure 5.

The frame members 14 are provided at their outer ends with brace bars 25, see Figure 4, which extend obliquely across the angles formed in the meeting ends of the side bars 15 and transversely disposed bar 16 of the frame member. A conventional swivel caster 26 is secured to each bar 25 to support the truck to be manipulated into a position underneath the jacked up wheel 10.

For manipulating the truck, a handle 27 formed of a metal rod bent to substantially V-shape, is provided at the ends with hooks 28, see Figure 3, which are engaged through openings formed in the front edge portion of the flat portions 12 of the platform.

Each jack is provided with a crank handle 29 which is rotatably mounted in an opening 30 formed in a respective upright supporting bar 31 which is secured to the outer end of one of the side bars 15 of the respective frame member, see Figure 4, by rivets 32 or other connectors.

The crank handle is connected to the conventional operating worm which is secured in a housing 33 formed on the barrel 21 of the jack. A helical spring 34 is connected at the lower end to an eye 35 on the respective jack pocket and is connected at the upper end to an eye 36 formed on the superposed flat portion 12 of the platform. The spring tends constantly to hold the jack retracted.

The frame members 14 extend normally in substantially horizontal position and just clear the floor, in which position of the parts the jacks 19 are retracted and the platform is disposed at its lowest limit of movement for manipulation to a position underneath the jacked up wheel 10 by use of the handle 27. When the wheel truck is in position underneath the jacked up wheel, the crank handles 29 of the jacks are rotated to extend the jacks, with the result that the platform 11 is lifted vertically and the frame members 14 assume an angular position with respect to the horizontal, see Figure 2, and reinforce the platform against collapse when the weight of the wheel 10 is supported by the platform. When the jacks have been extended sufficiently to cause the weight of the wheel to be supported on the central concave portion 13 of the platform, the handle 27 may be grasped to pull the truck away from the vehicle, thereby removing the wheel from the axle spindle. When the wheel is to be replaced, the above described movements are reversed.

From the above description, it is thought that the construction and operation of the invention will be fully understood without further explanation.

What is claimed is:

1. A vehicle wheel truck comprising a platform having flat portions at either end thereof and having a concave central portion adapted to receive a truck wheel, U-shaped supporting frame members having their legs pivotally secured at the ends to the underside of the concave portion of the platform adjacent opposite ends thereof, the transverse members of the frames extending to points adjacent the ends of and underneath the platform, jack pockets secured to the central portions of said tranverse members, double screw jacks having the lower ends loosely engaged in said pockets and having the upper ends loosely secured to the flat portions of the platform, and casters provided at the ends of the transverse bars of the U-shaped frame members, the frame members lying normally in horizontal position to permit the truck to be rolled from place to place on the casters, the frame members assuming an upwardly inclined position when the jacks are extended to reinforce the platform against collapse when the weight of the truck wheel is supported thereupon.

2. A vehicle wheel truck comprising a platform having flat portions at either end thereof and having a concave central portion adapted to receive a truck wheel, frame members pivotally connected to the underneath side of the concave portion at opposite sides of the transverse median line thereof and extending underneath said flat portions, jacks loosely secured at the bottoms to the frame members and loosely secured at the tops to the flat portions of the platform, helical springs secured to the frame members and to the flat portions of the platform tending constantly to hold the jacks collapsed, means for extending the jacks, casters at the corners of the frame members, and a substantially V-shaped handle connected at the ends to the front longitudinal edges of the flat portions of the platform for manipulating the platform underneath a jacked up truck wheel, actuation of said means extending the jacks to elevate the platform to support the truck wheel during removal and replacement.

HOWARD L. McGREGOR.